March 3, 1970    H. P. VONDERSCHMITT ET AL    3,498,309
DEVICE FOR MEASURING NARCOTIC GASES IN CLINICAL ROUTINE
Filed May 1, 1967    2 Sheets-Sheet 1

Inventor:

March 3, 1970    H. P. VONDERSCHMITT ET AL    3,498,309
DEVICE FOR MEASURING NARCOTIC GASES IN CLINICAL ROUTINE
Filed May 1, 1967
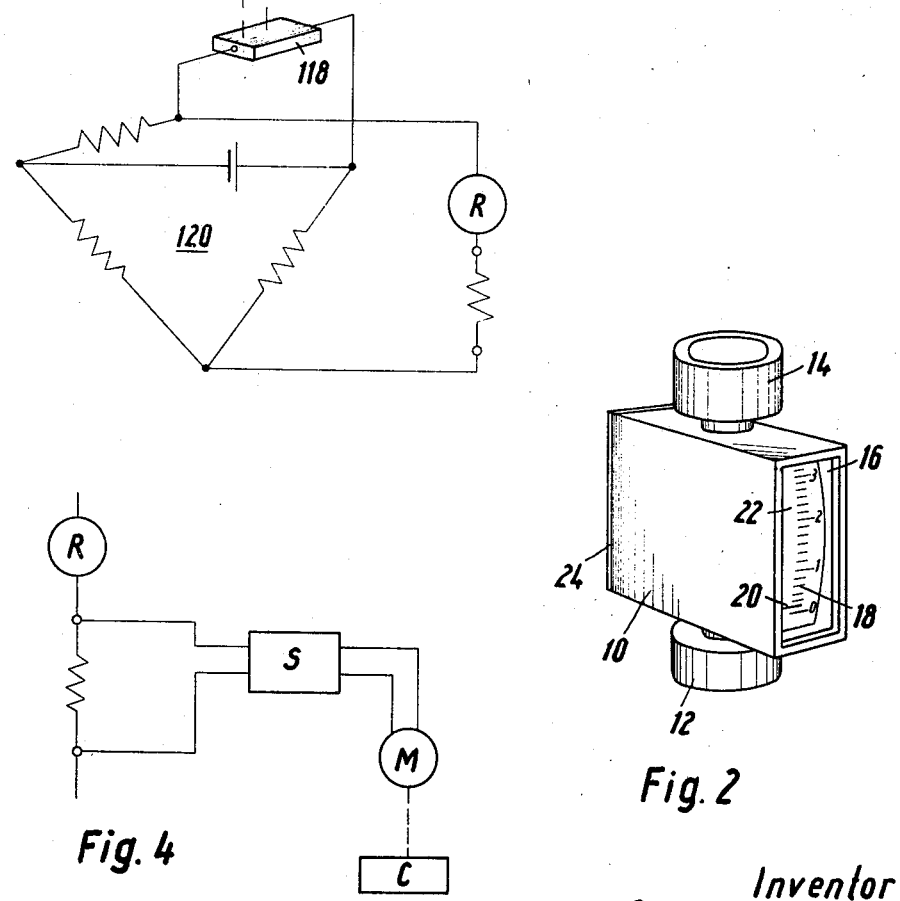

United States Patent Office 3,498,309
Patented Mar. 3, 1970

---

3,498,309
DEVICE FOR MEASURING NARCOTIC GASES IN CLINICAL ROUTINE
Helmut Philipp Vonderschmitt, Zeppelinstrasse 5, Neu-Isenburg, Germany, and Peter Emo Moyat, Vilbeler Landstrasse 6, Bergen, Kreis Hanau, Germany
Filed May 1, 1967, Ser. No. 634,958
Claims priority, application Germany, May 5, 1966, V 31,002
Int. Cl. G05d *11/08;* A61m *17/00;* G01d *5/34*
U.S. Cl. 137—88                                10 Claims

ABSTRACT OF THE DISCLOSURE

A device for measuring the concentration of a narcotic vapor in a gaseous flow to be inhaled by a patient comprises a casing housing at least one tape of a material that is capable of reversibly swelling in the presence of the narcotic vapor in the gaseous flow, the preferred material being silicone rubber having a thickness between 0.1 mm. and 1 mm. The tape is supported and mechanically biased, and the casing comprises means for transferring a variation of the length of the tape that is due to the narcotic vapor to an indicating member or to optical detecting means. The optical detecting means may generate electrical signals for controlling a recorder or for controlling the addition of the narcotic vapor to the gaseous flow. Means may be provided for compensating for water vapor carried by the gaseous flow.

BACKGROUND OF THE INVENTION

This invention relates to measuring instruments for use in clinics and particularly to instruments, by which the concentration of narcotic gases or vapors within a gaseous stream to be applied to a patient can be indicated, recorded or controlled.

In performing surgical operations, the patient is generally narcotized by diethylether and also by cyclopropane in some cases. The vapors of these substances are inflammable in the air and therefore tend to deflagrations and explosions. As more and more electrical devices are applied in surgery, increased danger of fire and explosions occurs, when using the respiratory anaesthetics mentioned before. The operation of electrical devices often causes sparking, whereby the present narcotic vapors are lighted.

In recent years incombustible narcotics have therefore entered into use in surgery, e.g., 1-bromo-1-chloro-2,2,2-trifluoroethane; 1,1,1-trifluoro-2-chloro-2 - bromoethane, or 1-bromo-1-chloro-2,2 - difluoropropane; 2,2-dichloro-1,1-difluoroethylmethylether. When supplying the named incombustible narcotic gases to the patient, considerable technical difficulties, however, have occurred with respect to their dosage hitherto.

For instance, the saturation partial pressure of 1-bromo-1-chloro-2,2,2 - trifluoroethane amounts to about 240 mms. Hg or to 30 percent by volume of an air mixture. On the other hand, the concentration to be supplied to the patient may not exceed 1.5 percent by volume, because a small overdosage can certainly result in depressions or stagnation of respiration and/or circulation of the blood.

German Patent No. 1,142,677 discloses that the evaporative rate of the narcotic substance and thereby its concentration in the flow of fresh gas to be applied to the patient can be maintained at a small extent by different means. In this way, a partial protection for the patient against overdosage is well imparted; a complete observation of the concentration of the narcotic gas to be supplied to the patient, however, is not possible, so that accidents due to an overdosage are not excluded.

When using 2,2-dichloro-1,1-difluoroethyl-methylether as a respiratory anaesthetic, there is the danger that this substance will deposit in the form of globules or small pools on its way to the patient from the evaporator due to its easy condensation characteristics. If the evaporator is cut off or removed to avoid an overdosage, these globules or pools will volatilize, so that the patient receives the undesired overdosage of the narcotic, although the operator assumes that the supply to the patient has been finished.

In order to assure the necessary dilution of the narcotic vapors in each case, vigorous supply of fresh gas is therefore preferred, but only a fraction of the supplied gases or vapors can be utilized by the patient. The remaining fresh gas which is mixed with the diluted narcotic gas, again enters the room. The air of the room of surgical operations, however, accumulates the narcotic gases which affect the personnel, when staying in that room for a longer time, and its accumulation in the air causes headaches and nausea.

According to German Patent No. 856,795 a control device adjusts the addition of a narcotic vapor to the flow of fresh gas in response to cooling of the evaporating narcotic liquid. The smaller the concentration of the evaporated narcotic substance in the gaseous condition, the more insensitive the control device, so that the device is well suitable for a narcosis utilizing diethylether, but not suitable for a narcosis using the non-inflammable 1-bromo-1-chloro-2,2,2-trifluoroethane (compare the partial pressures in the air).

Furthermore it is known that the moisture, i.e., the quantity of water vapor enclosed within a room filled with air or another gas is measured by means of a hygrometer. Its function is based on the fact that some organic substances vary their lengths or their volumes in response to the relative moisture of the gas. Prepared hairs of women, membranes of animals, several types of wood, foils of plastics and fibers of textiles are used for the mentioned purpose. Hygrometers using hairs are often applied and comparatively work with a good accuracy. For calibrating its graduations, the knowledge of some degrees of moisture is required which are adjusted by means of a hygrostat. Only such hairs can be utilized which are reversible, i.e., their response must be such that the pointer of the meter returns to its initial reading after a stand at a very high extent of moisture. Also hairs which lengthen themselves continuously, are not useful, because the pointer can not reach a final stand.

The designers of the known hair-hygrometers assert sometimes that not only the content of moisture within the air, but also the presence of some organic substances, e.g. benzene, gasoline or tetrachloromethane in the air can be determined by these meters. Such a theoretical conclusion appears to be evident to those skilled in the art; in practice, however, the difficulty arises namely to find materials which will respond to such organic substanues like the human hair responds to water vapor, i.e., will also swell in a completely reversible manner. The observation that, for instance, natural or synthetic rubbers will swell in gasoline vapors, however, appears to be not sufficient to assure that these materials are suitable for designing measuring devices which will operate according to the principle of the hair-hygrometers. Rubber swells in gasoline vapors not reversibly, as it elongates itself continuously, so that the pointer does not reach any final stand.

It has been known from the book with the title: "Ullmanns Encyklopädie der technischen Chemie," third edition of volume No. 9, Berlin and Munich, 1957, p. 350, that products vulcanized from silicone gum are swelled by solvents, e.g., aliphatic, aromatic and chlorinated hydrocarbons, and are attacked by concentrated acids and leaches. Also their good persistency without any aging effects has been known.

SUMMARY OF THE INVENTION

The merit of the invention consists of the observation that swelling characteristics of silicone rubber in the presence of the said respiratory anaesthetics which belong to the halogenated hydrocarbons and ethers, are completely reversible in a similar way as characteristics of human hairs within water vapor; a further merit is that said characteristics are utilized for designing a device which can measure narcotic gases and vapors and will work according to the principle of the hair-hygrometer, so that a relatively inexpensive device for measuring the concentration of respiratory anaesthetics is available for surgical operations in clinics.

Large apparatus for measuring the concentration of the incombustible, narcotic vapors mentioned previously are used in research and science; they utilize certain optical absorption bands within the ultraviolet or infrared range of the spectrum. The ultraviolet radiation decomposes these narcotics in a chemical process, in which poisonous derivatives are formed; in consequence thereof, it is not allowed to measure the concentration of the narcotic gas in the gaseous flow to be applied to the patient directly, in order to prevent the patient and the personnel being harmed by these poisonous substances. The measurements within the infrared spectrum, however, whereby poisonous derivatives are not formed, require enormous expenses to eliminate a plurality of disturbing factors; the expenses appear to be too large for clinical routine.

The primary object of the invention is to provide a reliable, mechanical device simply designed for measuring the concentration of narcotic vapors in the gaseous flow to be supplied to the patient for purpose of anaesthesia in clinical routine.

A further object of the invention is to provide an inexpensive device for measuring the concentration of narcotic vapors in a gaseous flow, whereby the effects of temperature variations and of admixture of water vapor are compensated.

A still further object of the invention is to connect an inexpensive mechanical device for measuring the concentration of narcotic vapors in a gaseous flow to be applied to the patient with electrical means for recording the measuring results.

An additional object of the invention is to connect an inexpensive device for measuring the concentration of narcotic substances in a gaseous flow to be applied to the patient with electro-mechanical means for controlling the admixture of the narcotic vapor to a stream of fresh gas.

In a preferred embodiment of the invention, the end portions of at least one tape of a material swelling in narcotic vapors reversibly are supported and biased mechanically within a casing having an inlet and an outlet, and mechanical means transfer a variation of length of said tape caused by the presence of the said vapors to an indicating member. Preferably, the said tape consists of silicone rubber, and its thickness can be in the range between 0.1 mm. and 1 mm.

Preferably, the variation of length of the said tape caused by narcotic vapors can be increased by provision of a kink in the intermediate portion of the length of the said tape and by biasing the kink of the tape towards said mechanical transfer means.

In order to avoid undesired effects on the measurements due to variations of temperature, mechanical compensating means can be provided. To avoid troubles due to variations of the content of water vapor in the gaseous flow carrying narcotics, mechanical means for compensating for the water vapor variations can be provided.

In order to record the readings, the indicating member can be associated with a mask varying the size of a light beam of a photoelectric arrangement, with which a recorder is connected.

In order to control the admixture of the narcotic vapors to the flow of fresh gas, the indicating member can be associated with a mask varying the size of a light beam within a photoelectric arrangement, with which a servo-mechanism and a positioning motor for a control valve are connected.

BRIEF DESCRIPTION OF THE DRAWINGS

FIGURE 2 is a perspective view of the casing of the meter, FIGURE 3 is a schematic view of an apparatus for connecting the meter with a recorder, FIGURE 4 is a schematic view of an apparatus for connecting the meter with a controller.

DESCRIPTION OF THE PREFERRED EMBODIMENTS

Figure 1:
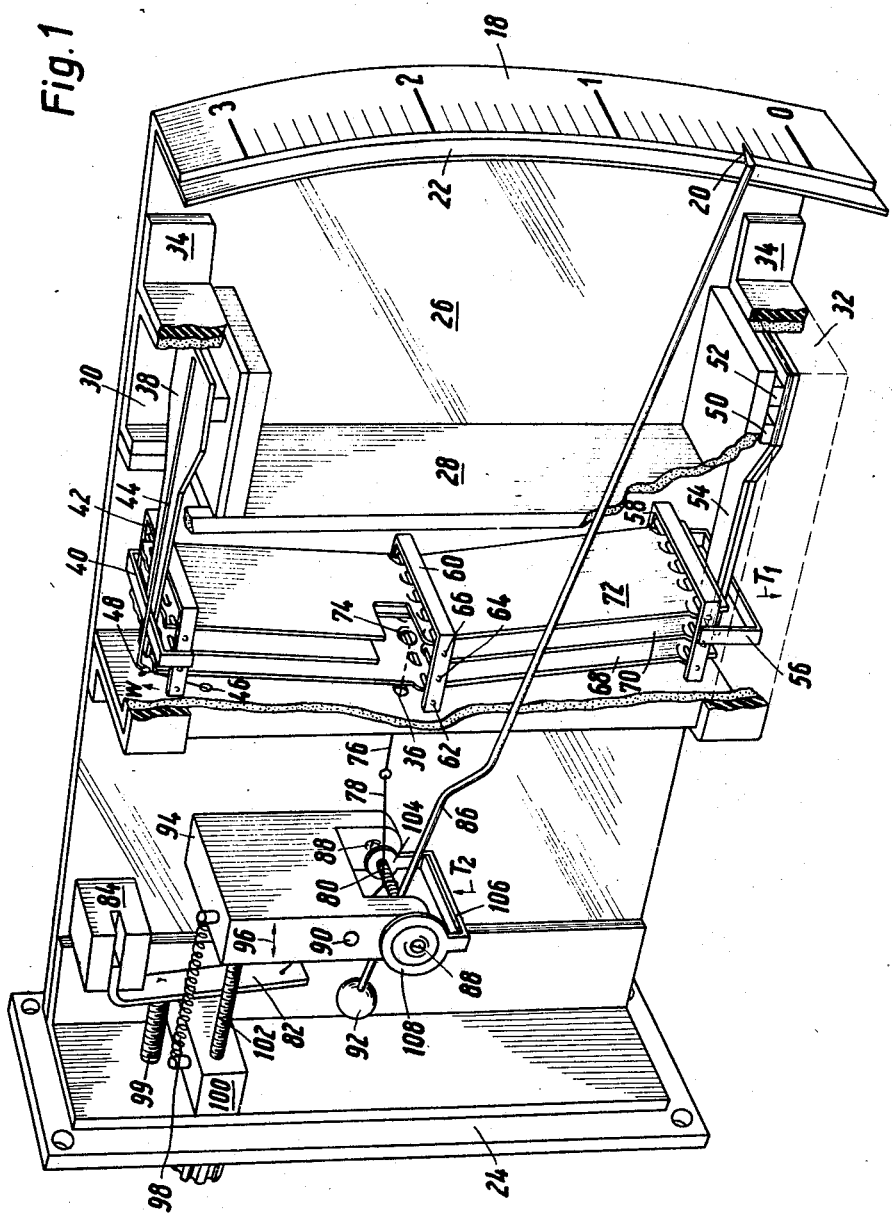
FIGURE 1 is a perspective view of the internal body of the meter, wherein walls and gaskets of the chute guiding the gaseous flow are partly broken away.

Referring to FIGURE 2 of the drawings, the external casing of the device for measuring narcotic gases is shown. It includes a parallelpiped block 10, the bottom of which carries a pipe fitting 12; a second pipe fitting 14 is provided on the top of the block 10. Preferably, the lower fitting 12 can be connected with a manifold (not shown), which introduces fresh gas which is intermixed with respiratory anaesthetic vapors or gases to be measured. The gaseous flow containing the narcotic passes the block 10 and emanates from the outlet 14, with which a pipe (not shown) is connected; in this way the flow is supplied to the patient. The front of the block 10 is covered with a glass plate 16; a graduation plate 18 of the meter is arranged behind the said plate 16. A pointer 20 moves in front of a white area 22. The pointer 20 and the graduation plate 18 are arranged in such a relation that the indications can be read without any parallax.

Measuring means, as shown in FIGURE 1 in detail, can be shifted into the block 10, when grasping an end plate 24 by hand. The end plate 24 is screwed on the block 10 at that end remote from the glass plate 16, and a gasket (not shown) is inserted. If not stated otherwise, all attaching means of the members of the meter are provided by adhesives, preferably by epoxy resins, in order to avoid the use of a screw or other mechanical means which may loosen and vibrate. Also, all members housed in the block 10 consist of materials resistant to corrosion caused by water, carbon dioxide and narcotic vapors, if not indicated otherwise.

A vertical base 26 extends to the graduation plate 18 from the end plate 24; substantially all members of the device are mounted on the base 26. Also it forms one side wall of a chute 28, through which the main gaseous flow is directed from the bottom upwardly. Sieves (not shown) are positioned between both the fitting 12 and the inlet of the chute 28 and the fitting 14 and the outlet, to prevent coarse impurities from entering the chute 28. Two side walls of the chute are partly broken away, to allow an interior view to the chute.

Each end of the chute 28 is widened by one compartment 30 and 32, resp. Sealing felts 34 are laid around both ends of the chute 28 and both compartments 30 and 32; the felts are also partly broken away. They cause the entering gaseous flow to be limited substantially to the chute 28, although small volumes of the gas to be measured can leave the chute 28 through a hole 36 in one side wall and can spread themselves out in the whole inside space of the block 10.

The broad end of a flat spring 38 is attached to the bottom wall of the compartment 30 by a block; the tapered opposite end of the spring projects into the chute, and there it supports a U-shaped frame 42 in a substantially horizontal position by means of a yoke 40. A wire 44 extends on the surface of the flat spring 38 substantially along a central line and protrudes beyond the tapered end of the spring 38, so that a small free end of the wire 44 can be bent in form of a hook.

A string 48 of polyamide-plastics, e.g., nylon is strained between the hooked end of the wire 44 and an ear 46 at the one side wall of the chute 28. This string compensates for influences of the water vapor carried by the gaseous flow, thus affecting the measurements. The string 48 expands, if the concentration of water vapor is increasing, whereby the tapered end of the biased flat spring 38 will turn up. The expansion of the string 48 within saturated water vapor amounts to about 8 to 10 percent of its length, compared with a dry atmosphere, and the elongation of the string 48 due to the water vapor is indicated by an arrow W.

The broad end of a slightly curved bimetal-spring 54 is fixed by two blocks 50 and 52 to the covering wall of the compartment 32, partly broken away. When assembling the meter, the block 52 is adhered to the covering wall of the compartment 32, also partly broken away, and to the bimetal-spring 54, while the block 50 is movable for calibrating the meter. As the slight curvatures can be different between the springs, the spring 54 can be biased the desired degree by shifting the block 50. During the calibration the block 50 is attached to the covering plate. The end of the spring 54 remote from the broad end freely projects into the chute 28 and is similarly tapered as the end of the flat spring 38. A yoke 56 is connected with this free end; it carries a U-shaped frame 58 in a substantially horizontal position. This frame 58 corresponds to the frame 42 and to a third frame 60.

Some thin rods 62, 64 and 66 are arranged in parallel between the two brackets of the U-shaped frames 42, 58 and 60 (only one end of the rods can be seen in the three frames). Tapes 68, 70 and 72 produced from silicone rubber are pricked through by these rods several times, as one can see from the rod 62 in the frame 60. There are parts broken out of the tapes 70 and 72, so that one can see, in which manner the rod 62 extends through the central portion of the tape 68. A thin wire 76 produced from a corrosion resistive metal, e.g., stainless steel is slung around the rod 62 at a place 74; it extends through the hole 36 in the one side wall of the chute 28. A string 78 produced from terylene-type terephthalacid-polyester-fiber having the trademark "Trevira" is affixed to the opposite end of the wire 76. This string 78 exhibits a very small swelling in water vapor which amounts to 0.2 to 0.3 percent of its length and can therefore be used as substantially inert mechanical transfer means. It extends around a shaft 80 journaled without any substantial friction to a biased leaf spring 82 which tends to cause the string 78 engaging the shaft 80 by friction to draw away from the tapes 68, 70 and 72 of silicone rubber. The upper end of the spring 82 is clamped and fastened in a block 84 which is adhered to the base 26.

Due to biasing the spring 82, the tapes 68, 70 and 72 fastened substantially in their middle portions by the frame 60 to each other, are kinked by the frame 60. The degree of bending out depends on the positions of the springs 38, 54 and 82 relatively to each other. In each case, the tapes 68, 70 and 72 are continuously biased uniformly. If their lengths change due to swelling, the kink angle and the position of the lower end of the biasing spring 82 will also vary, because the wire 76 and the string 78 transfer the slight variation of lengths as a translational motion to the end of the spring 82. As the string 78 engages the shaft 80 by friction, its translational motion is converted into rotational motion of the shaft 80. Both ends of the shaft 80 are journaled on points by means of bearing jewels within a block 94 without having any appreciable friction; the block 94 can be tilted by a small angle around a fixed pivot 90, as indicated by a double arrow 96 above the visible end of the pivot 90. A member 86 of the pointer 20 extends through a transverse bore in the shaft 80; for reasons of a more favourable balance, the end of the member 86 remote from the pointer 20 carries a counterweight 92, as represented by a ball of lead. In place of such a ball, also one or more screw threads and balancing nuts can be used for adjusting the uniform load on the shaft 80 by hand.

The end of the pivot 90 (not shown) is firmly fitted in the base 26. A helical tension spring 98 is fastened to the top face of the block 94 and continuously tends to cause the block 94 to tilt around the pivot 90 counterclockwise. The other end of the tension spring 98 is fastened to a stationary block 100 mounted on the base 26 also. A screw 102 and a setscrew 99 extend through the end plate 24; the bias of the spring 82 can be adjusted by means of the setscrew 99 from outside, whereby the sensitivity of the meter can be changed deliberately. An adjusting knob is provided on the end of the screw 102 projecting from the end plate 24 outwardly, while the other end rests on the back wall of the tiltable block 94. Upon rotating the adjusting knob, the block 94 tilts around the pivot 90. Due to this motion, also the shaft 80 rotates around the pivot 90. If the string 78 is not subjected to any translational motion, the shaft 80 is slightly rotated due to the frictional engagement of the resting string 78, whereby the pointer 20 slightly migrates adjacent the graduation plate 18. In this way the zero position of the pointed 20 can be improved by means of the adjusting knob by hand.

A collar 104 seats on the shaft 80 journalled on points without any substantial friction and carries a bimetal strip 106 extending in parallel with the shaft 80. An annulus 108 is fixed to the free end of the bimetal strip 106 projecting beyond the front face of the block 94. At a predetermined temperature of 20 degrees Celsius, for instance, the centre of gravity of this annulus 108 is nearly coincident with the extended central axis of the shaft 80. In this condition, the rotatable system consisting of the shaft 80, the pointer 20, the member 86, the counterweight 92, the collar 104, the bimetal 106 and the annulus 108 is balanced such that no rotational force is acting upon the shaft 80 in each angular position of the system, which force would tend to rotate the shaft 80. As soon as the temperature, however, rises in the inside of the casing 10, the bimetal strip 106 bends upwardly, as indicated by an arrow $T_2$, and the annulus 108 is raised slightly.

Now it may be assumed that due to this small motion of the annulus 108 the mechanical system disclosed above is deflected into a second position of unstable blance from the first position in which the system is in an indifferent balance at each angle. Upon raising the annulus 108, the system should furthermore be in such condition of unstable balance in an angular position, in which the pointer 20 indicates the zero mark of the graduation 18. This zero position should remain unchanged upon temperature variations within the casing 10.

If fresh gas intermixed with narcotic vapors will now flow through the chute 28, and the tapes 68, 70 and 72 expand themselves due to their swelling. At the predetermined temperature of 20 degrees Celsius, as mentioned above, this expansion of the tapes is proportional to the concentration of the narcotic vapors in the gaseous flow and is directly indicated in volume percent by the graduation plate 18 at an atmospheric pressure of 760 mms. Hg, after the necessary calibration was performed. If the stream of fresh gas exhibits an increased temperature of 30 degrees Celsius, for instance, the tapes 68, 70 and 72 only expand themselves due to this temperature increase, if no narcotic vapor is admixed. Because of this thermal expansion, the pointer 20 adjusted to zero would migrate by some extent upwardly, as the tapes will kink to a great extent. To prevent this, the bimetal strip 54 opposes in such a manner that it draws the lower ends of the tapes in the direction of an arrow $T_1$. By this action, the linear effect of expansion of the tapes with increasing temperatures is compensated.

A second temperature effect is superpositioned with this first linear effect in the presence of the narcotic vapors and can be derived from Henry-Dalton's law. In other words, the higher the temperature, the smaller the variation of length of the tapes 68, 70 and 72 at a given concentration of the narcotic vapors. In absence of the narcotic, this second effect does not occur, because any swelling does not take place. This second temperature effect is compensated for by means of the mechanical system rotatable within the block 94, as described above. In the zero position of the pointer 20 adjacent the graduation plate 18, the annulus 108 is raised by the bimetal strip 106 in the direction of the arrow $T_2$, so that the system occupies a position of an unstable balance. If the narcotic vapor is admixed to the gaseous flow, the variations of length of the tapes 68, 70 and 72 occurring at increasing concentrations are converted to the rotation of the shaft 80. Because of the unstable balance of the mechanical system caused by bending the bimetal strip 106, a torque growing with increasing angle is added to this rotational motion of the pointer 20 from the zero position adjacent the graduation 18.

The first effect of temperature, i.e., the variation of length of the tape produced from silicone rubber in response to the temperature in absence of any swelling agent (water vapor and narcotic) amounts to about 0.2 percent of the length of the tape per degree Celsius. Because of the kinked suspension of the tapes 68, 70 and 72, this effect is multiplied by a factor of 4 to 5. The second temperature effect, i.e., the variation of length due to a reduced swelling with increasing temperatures at the same concentration of narcotic, amounts to about 4 percent of the variation of length of the tape per degree Celsius which is caused by variation of the concentrations of the narcotic applied to the patient.

Silicone rubber of the tapes 68, 70 and 72 can be replaced by some other plastic whose swelling in the narcotic vapors is completely reversible, in case the plastic is free of aging and memory effects. In this connection, it is possible to use copolymers of butadiene and acrylonitrile, as known by the trademark "Perbunan," and polyurethanes, as known by the trademark "Vulkollan."

FIGURE 3 shows, how the mechanical device for measuring narcotic gases and vapors (FIGS. 1 and 2) can be connected with recorder R electrically. The biasing spring 82 which raws the string 78 of "Trevira" and is clamped in the block 84 on the base 26 at its one end, carries a metallic leaf 110 which extends in a substantially horizontal direction and is sharpened at its free end like a knife edge. This end projects into an optical beam B, as indicated by dashed lines.

The beam B is produced within a casing 112 housing an electrical lamp and a collimating lens (both not shown) and also fastened to the base 26. The lamp is fed from D.C. source 114 which is outside the block 10 of the meter (FIGURE 2). Furthermore, a mirror 116 is mounted on the base 26 and deflects the beam emanating from the casing 112 by an angle of nearly 90 degrees and directs it to a photoresistor 118. The supply lines of the lamp and the output lines of the photoresistor 118 pass the end plate 24 by hermetical sealings (not shown). A bridge circuit 120 connected with the photoresistor 118 is outside the block 10 (FIGURE 2) and is designed, as known per se, so that it will not be described in detail. The bridge circuit 120 includes the recorder R.

The translational motion of the string 78 which is converted to the rotational motion of the shaft 80 and to the indicatnig motion of the pointer 20 (FIGURE 1), is also transferred to the metallic leaf 110 attached to the biased spring 82. As this leaf 110 projects into the optical beam B, the diameter of the beam B is increased or reduced due to the motion of the string 78; this variation is again detected by the photoresistor 118 and is recorded by the deflection of the recorder R.

As one can see from FIGURE 4, the bridge circuit 120 can also be connected with a servo-mechanism S having a motor M for controlling a control valve C, as known per se. This valve C regulates the addition of the narcotic vapor to the flow of the fresh gas and thus its concentration automatically. In this way, the concentration of the narcotic vapor in the gaseous flow to be applied to the patient can be maintained constant, although the temperature of the gaseous flow and its content of water vapor can vary in the course of the surgical operation. The circuit of FIGURE 4 and the design of the control valve C are known per se, and therefore they are not described in detail.

Having described the invention, we claim:

1. Device for measuring the concentration of at least one narcotic vapor in a gaseous flow to be inhaled by a patient in clinical routine, comprising a casing housing at least one tape of silicone rubber that is capable of reversibly swelling in the presence, in the gaseous flow, of 1.5 percent by volume of a narcotic vapor of the class consisting of 1-bromo-1-chloro-2,2,2-trifluoroethane; 1,1,1-trifluoro-2-chloro-2-bromoethane; 1 - bromo-1-chloro-2,2-difluoropropane and 2,2-dichloro-1,1-difluoroethylmethylether, the tape being supported and mechanically biased, and the casing comprising means for mechanically transferring to an indicating member a variation of the length of the tape that is due to the narcotic vapor.

2. Device according to claim 1 characterized in that the middle portion of the length of said tape is kinked, whereby the kink is biased towards said mechanical transfer means.

3. Device according to claim 1, comprising mechanical means for compensating for variations of the length of the tape due to temperature variations of the gaseous flow.

4. Device according to claim 1 wherein the indicating member comprises optical detecting means, and wherein means for generating electrical signals, for controlling a recorder, are controlled by the optical detecting means.

5. Device according to claim 1 wherein the indicating member comprises optical detecting means, and wherein means for generating electrical signals are controlled by the optical detecting means, and means are provided for controlling the addition of the narcotic vapor to the gaseous flow to be inhaled by the patient in response to the generated electric signals.

6. Device for measuring the concentration of at least one narcotic vapor in a gaseous flow to be inhaled by a patient in clinical routine, comprising a casing housing at least one tape of silicone rubber that is capable of reversibly swelling in the presence of the narcotic vapor in the gaseous flow, the tape being between 0.1 mm. and 1 mm. in thickness and being supported and mechanically biased, and the casing comprising means for mechanically transferring to an indicating member a variation of the length of the tape that is due to the narcotic vapor.

7. Device according to claim 6 characterized in that the middle portion of the length of said tape is kinked, whereby the kink is biased towards said mechanical transfer means.

8. Device according to claim 6, comprising mechanical means for compensating for variations of the length of the tape due to temperature variations of the gaseous flow.

9. Device according to claim 6 wherein the indicating member comprises optical detecting means, and wherein means for generating electrical signals, for controlling a recorder, are controlled by the optical detecting means.

10. Device according to claim 6 wherein the indicating member comprises optical detecting means, and wherein means for generating electrical signals are controlled by the optical detecting means, and means are provided for controlling the addition of the narcotic vapor to the gaseous flow to be inhaled by the patient in response to the generated electric signals.

References Cited

UNITED STATES PATENTS

| | | | |
|---|---|---|---|
| 1,743,792 | 1/1930 | Moeger | 250—231 |
| 2,268,442 | 12/1941 | Crawford | 73—335 |
| 3,016,744 | 1/1962 | Goss | 73—337.5 |

FOREIGN PATENTS 625,443  6/1949  Great Britain.

ALAN COHAN, Primary Examiner

H. M. COHN, Assistant Examiner

U.S. Cl. X.R.

72—23; 128—188; 250—231